United States Patent
Johnson et al.

(10) Patent No.: US 9,148,991 B2
(45) Date of Patent: Oct. 6, 2015

(54) GATE RETENTION FOR AN INDUCTOR BOX OF AN AGRICULTURAL IMPLEMENT

(71) Applicant: CNH America LLC, New Holland, PA (US)

(72) Inventors: Chad M. Johnson, Arlington Heights, IL (US); Marvin A. Prickel, Homer Glen, IL (US); Michael J. Connors, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 43 days.

(21) Appl. No.: 13/737,334

(22) Filed: Jan. 9, 2013

(65) Prior Publication Data

US 2014/0190584 A1 Jul. 10, 2014

(51) Int. Cl.
| | |
|---|---|
| A01C 7/04 | (2006.01) |
| A01C 7/08 | (2006.01) |
| A01C 7/10 | (2006.01) |
| A01C 19/02 | (2006.01) |
| B60R 99/00 | (2009.01) |

(52) U.S. Cl.
CPC . *A01C 7/081* (2013.01); *A01C 7/04* (2013.01); *A01C 7/082* (2013.01); *A01C 7/10* (2013.01); *B60R 99/00* (2013.01); *Y10T 137/6855* (2015.04)

(58) Field of Classification Search
CPC ............ A01C 7/00; A01C 7/04; A01C 7/042; A01C 7/08; A01C 7/10; A01C 7/123; A01C 7/124; A01C 7/125; A01C 7/081; A01C 7/082; A01C 19/02; B60R 99/00; Y10T 137/6855; Y10T 137/6851; Y10T 137/00
USPC .................................. 111/170, 174–188, 200
See application file for complete search history.

(56) References Cited

U.S. PATENT DOCUMENTS

| | | | |
|---|---|---|---|
| 3,738,546 | A | 6/1973 | Speicher |
| 4,473,016 | A | 9/1984 | Gust |
| 5,697,535 | A | 12/1997 | Coleman |
| 5,915,312 | A | 6/1999 | Meyer et al. |
| 6,505,760 | B1 | 1/2003 | Werner |
| 6,634,678 | B2 | 10/2003 | Mariman |
| 7,690,440 | B2 | 4/2010 | Dean et al. |
| 2012/0017812 | A1 | 1/2012 | Renyer et al. |
| 2012/0169495 | A1 | 7/2012 | Kowalchuk |
| 2012/0181093 | A1 | 7/2012 | Fehr et al. |

*Primary Examiner* — Christopher J Novosad
(74) *Attorney, Agent, or Firm* — Rebecca L. Henkel

(57) ABSTRACT

An inductor box for an agricultural implement includes an inlet configured to receive agricultural product from a tank. The inductor box also includes a housing having a cavity therein. The cavity is configured to receive the agricultural product from the inlet. The inductor box includes a gate configured to be removably inserted between the inlet and the cavity, to block the agricultural product from entering the cavity while disposed between the inlet and the cavity, and to enable the agricultural product to enter the cavity while removed from being disposed between the inlet and the cavity. The inductor box includes a first guide coupled to the housing and configured to direct the gate away from the inlet. The first guide is disposed between the gate and the inlet while the gate is disposed between the inlet and the cavity.

6 Claims, 6 Drawing Sheets

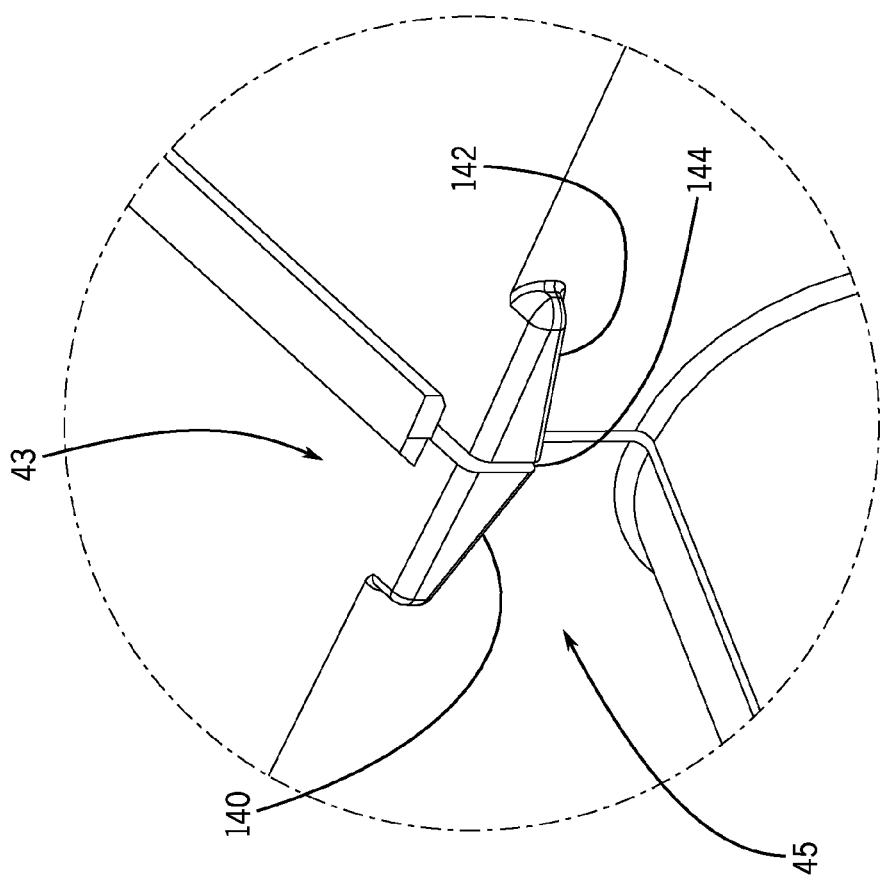

GATE RETENTION FOR AN INDUCTOR BOX OF AN AGRICULTURAL IMPLEMENT

BACKGROUND

The invention relates generally to ground working equipment, such as agricultural equipment, and more specifically, to gate retention for an inductor box of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a remote tank, and a pneumatic distribution system configured to convey seeds from the tank to each row unit. For example, the pneumatic distribution system may include an inductor box positioned beneath the tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

Certain planting implements may be configured to block seed flow between the tank and the inductor box. For example, a gate may be placed between the tank and the inductor box to block the seed flow. However, the gate may be difficult to install and/or may not sufficiently block the seed flow. Furthermore, the gate may become lost and/or misplaced when not being used.

BRIEF DESCRIPTION

In one embodiment, an inductor box for an agricultural implement includes an inlet configured to receive agricultural product from a tank. The inductor box also includes a housing having a cavity therein. The cavity is configured to receive the agricultural product from the inlet. The inductor box includes a gate configured to be removably inserted between the inlet and the cavity, to block the agricultural product from entering the cavity while disposed between the inlet and the cavity, and to enable the agricultural product to enter the cavity while removed from being disposed between the inlet and the cavity. The inductor box includes a first guide coupled to the housing and configured to direct the gate away from the inlet. The first guide is disposed between the gate and the inlet while the gate is disposed between the inlet and the cavity.

In another embodiment, an inductor box for an agricultural implement includes an inlet configured to receive agricultural product from a tank. The inductor box also includes a housing having walls at least partially enclosing a cavity. The cavity is configured to receive the agricultural product from the inlet. The inductor box includes a gate configured to be removably inserted between the inlet and the cavity, to block the agricultural product from entering the cavity while disposed between the inlet and the cavity, and to enable the agricultural product to enter the cavity while removed from being disposed between the inlet and the cavity. The inductor box also includes guides coupled to the housing and configured to direct the gate away from the inlet. The guides are disposed between the gate and the inlet while the gate is disposed between the inlet and the cavity. One of the walls includes a slot configured to receive the gate.

In a further embodiment, an inductor box for an agricultural implement includes an inlet configured to receive agricultural product from a tank. The inductor box also includes a housing having a cavity therein. The inductor box includes inductor segments arranged within the cavity. Each inductor segment is configured to receive the agricultural product from the inlet and to direct the agricultural product out of the inductor box through an output port. The inductor box also includes a gate configured to be removably inserted between the inlet and the cavity, to block the agricultural product from entering the plurality of inductor segments while disposed between the inlet and the cavity, and to enable the agricultural product to enter the plurality of inductor segments while removed from being disposed between the inlet and the cavity. Each inductor segment includes a guide disposed between the gate and the inlet while the gate is disposed between the inlet and the cavity. The guide is configured to direct the gate away from the inlet.

DRAWINGS

These and other features, aspects, and advantages of the present invention will become better understood when the following detailed description is read with reference to the accompanying drawings in which like characters represent like parts throughout the drawings, wherein:

FIG. 6 is a perspective view of an embodiment of a portion of the inductor box of FIG. 3 including a guide, taken within line 6-6.

DETAILED DESCRIPTION

Figure 1:
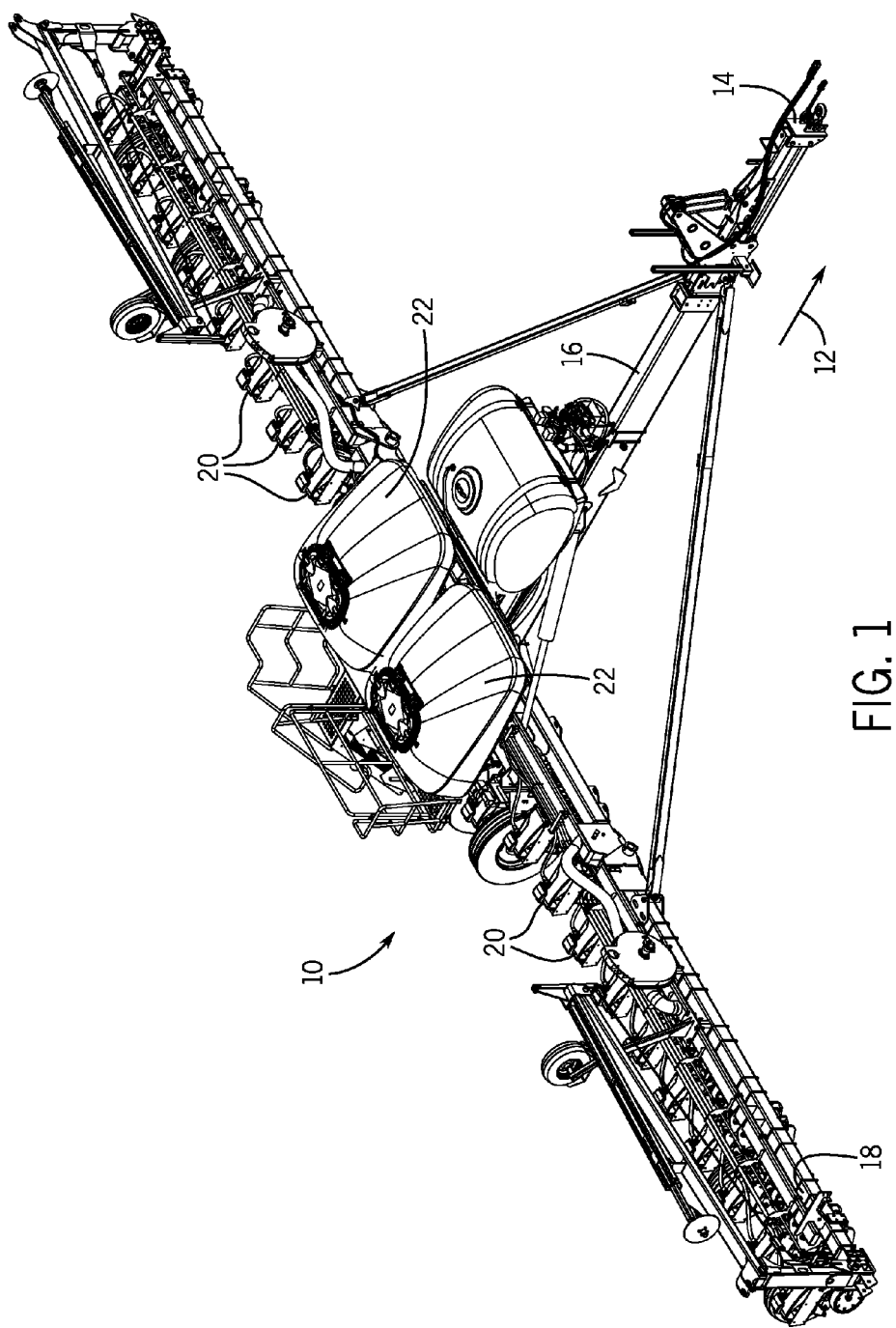
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes tanks 22, and a pneumatic distribution system configured to convey seeds from the tanks to the row units 20. In certain embodiments, the pneumatic distribution system includes an inductor box positioned beneath each tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a desired trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soybeans.

In one embodiment, the inductor box includes an inlet, a housing, a gate, and guides. The inlet is configured to receive agricultural product from the tank 22. Moreover, the housing includes a cavity configured to receive the agricultural product from the inlet. The gate is configured to be removably inserted between the inlet and the cavity. In particular, the gate blocks the agricultural product from flowing into the cavity while disposed between the inlet and the cavity, and the gate enables the agricultural product to enter the cavity while removed from being disposed between the inlet and the cavity. The guides are coupled to the housing and configured to direct the gate away from the inlet. Moreover, the guides are disposed between the gate and the inlet while the gate is disposed between the inlet and the cavity. The guides may be configured to reduce the possibility of the gate being deflected upwardly by agricultural product and forming a gap between the gate and the cavity. As a result, agricultural product may be blocked from flowing past the gate in either direction. Furthermore, the guides may be shaped to facilitate insertion of the gate. By having such guides, the gate may be readily installed and/or may sufficiently block the flow of agricultural product between the tank 22 and the cavity of the inductor box. Accordingly, the efficiency of the inductor box may be improved, thereby reducing costs of operating the inductor box.

Figure 2:
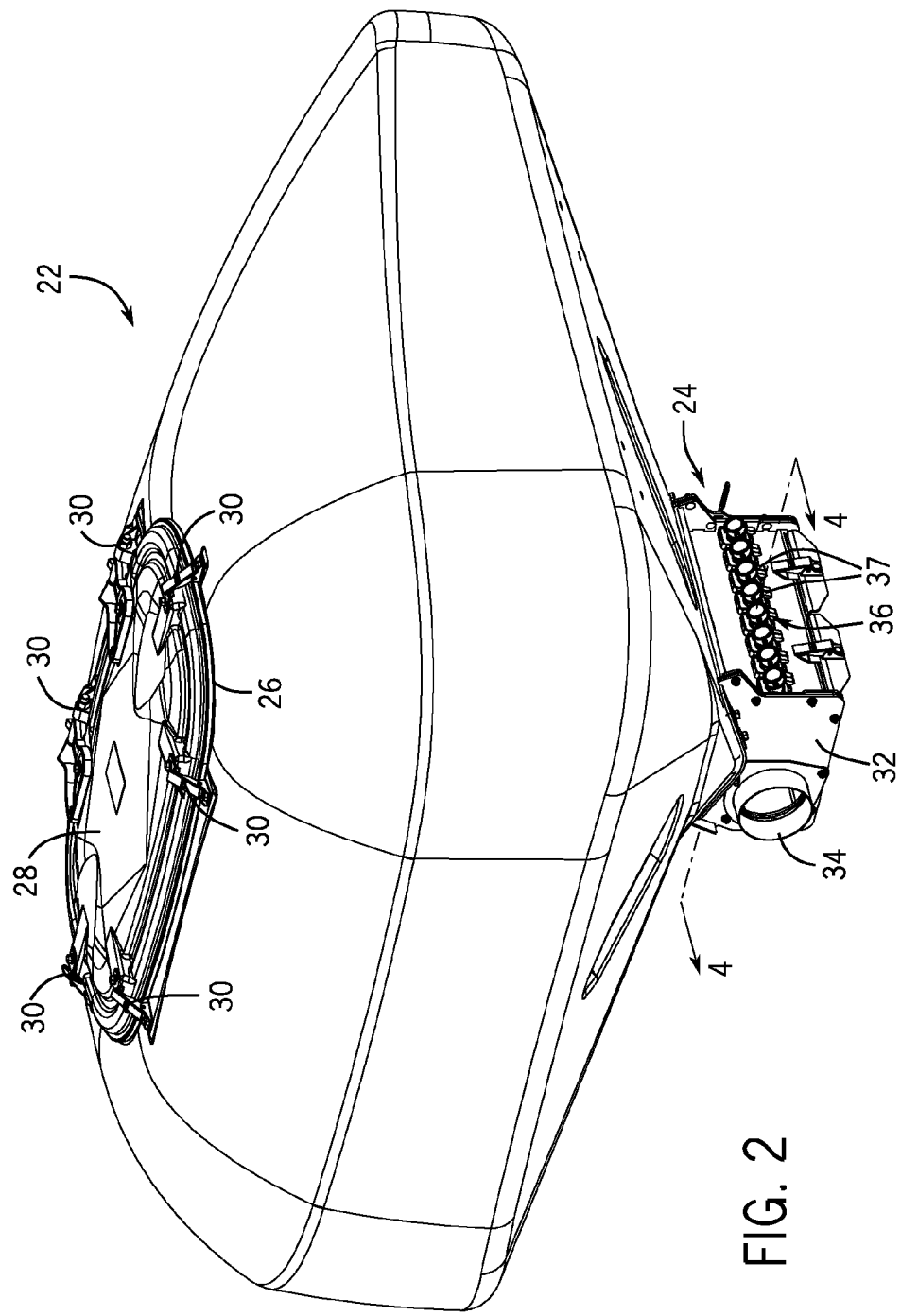
FIG. 2 is a perspective view of an embodiment of a tank of the agricultural implement of FIG. 1 coupled to an inductor box.

FIG. 2 is a perspective view of an embodiment of the tank 22 of the implement 10 of FIG. 1 coupled to an inductor box 24. The tank 22 includes an opening 26 for receiving an agricultural product (e.g., seeds, fertilizer, etc.). The tank 22 keeps the agricultural product contained therein using a lid 28 that covers the opening 26. The lid 28 securely attaches to the tank 22 with multiple fasteners 30. On the opposite side of the tank 22 is the inductor box 24. The inductor box 24 attaches to the tank 22 opposite the lid 28 and is configured to receive gravity-fed agricultural product from the tank 22. The inductor box 24 includes a housing 32 that is coupled to the tank 22. Moreover, the inductor box 24 includes an air supply port 34, and multiple inductor segments 36. The air supply port 34 receives airflow from an air supply (e.g., a fan, etc.). The airflow from the air supply enables the inductor box 24 to fluidize the agricultural product and/or pressurize the tank 22. In some embodiments, the tank 22 may be made of a flexible material that expands with pressurized airflow from the air supply. The inductor box 24 channels airflow from the air supply to the inductor segments 36 and/or into the tanks 22. The inductor segments 36 fluidize the agricultural product with the airflow for delivery through agricultural product delivery ports 37 to the row units 20.

Figure 3:
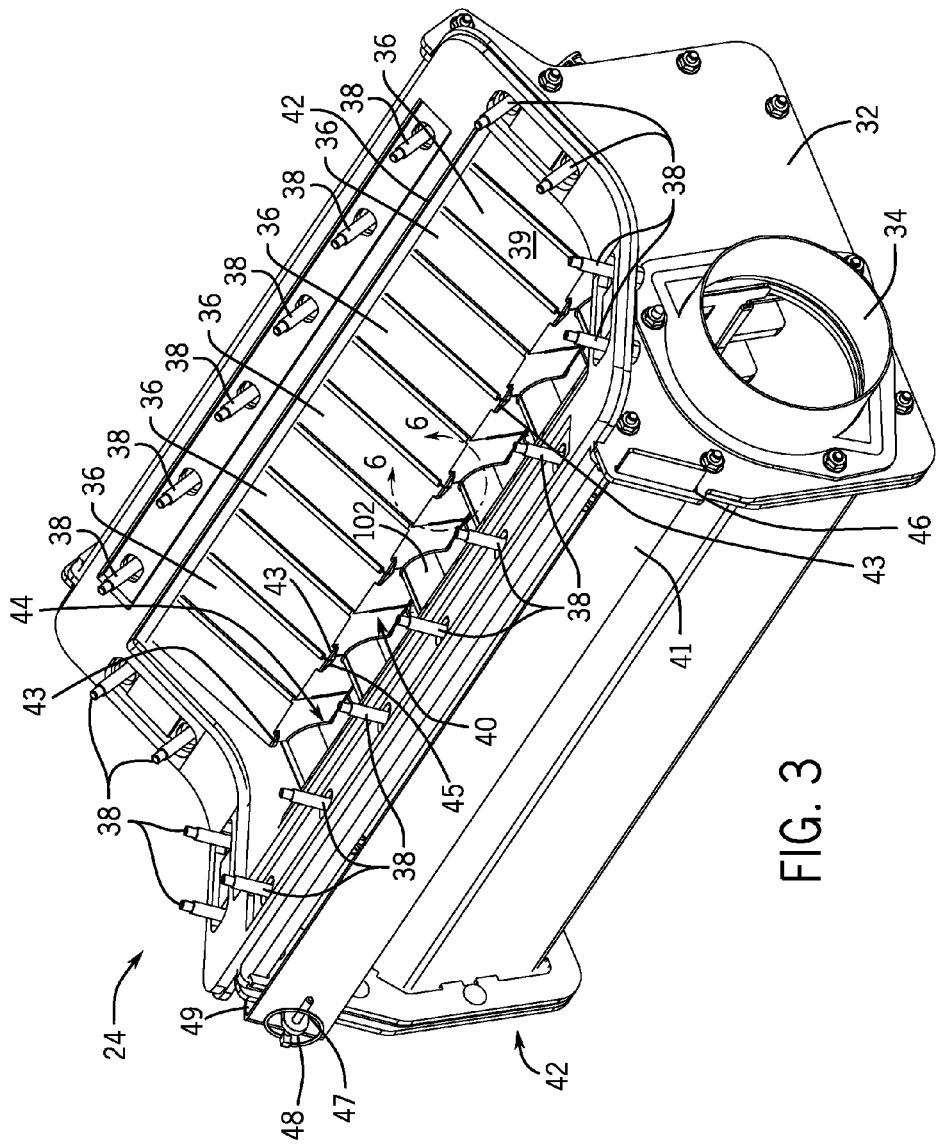
FIG. 3 is a perspective view of an embodiment of the inductor box of FIG. 2 including guides.

FIG. 3 is a perspective view of an embodiment of the inductor box 24 of FIG. 2 including guides. In the illustrated embodiments, bolts 38 are used to attach the inductor box 24 to the tank 22; however, in other embodiments, other fasteners may be used to attach the inductor box 24 to the tank 22. As illustrated, the inductor box 24 includes multiple inductor segments 36 disposed within a cavity 40 of the housing 32. Furthermore, each inductor segment 36 includes structures that are arranged within the housing 32 of the inductor box 24. A top 39 of the inductor segments 36 is sloped to direct agricultural product from the tank 22 into the inductor segments 36. In the illustrated embodiment, there are twelve inductor segments 36. However, other embodiments may include a different number of inductor segments 36 (e.g., 1, 2, 3, 4, 5, 6, 7, 8, 9, 10, or more). The agricultural product enters the inductor segments 36 from the tank 22. Within the inductor segments 36, the agricultural product is fluidized (i.e., mixed with air). After the agricultural product is fluidized, the air/agricultural product mixture exits the inductor box 24 through the agricultural product delivery ports 37.

As illustrated, the inductor box 24 includes a gate 41 that may be removably inserted into a slot on a side 42 of the inductor box 24 to block agricultural product from flowing between the tank 22 and the cavity 40/the inductor segments 36. Furthermore, one or more of the inductor segments 36 includes guides 43 configured to direct the gate 41 away from an inlet 44 of the inductor box 24 while the gate 41 is being inserted into the inductor box 24. The inlet 44 of the inductor box 24 is the portion of the inductor box 24 between the guides 43 and the tank 22 while the tank 22 is attached to the inductor box 24. Moreover, the inlet 44 is configured to receive the agricultural product from the tank 22. As may be appreciated, the guides 43 may be integrally formed with the inductor segments 36. Furthermore, as illustrated, each guide 43 may be formed at a junction between two inductor segments 36. In other embodiments, the guides 43 may be formed as separate components from the inductor segments 36 and may be attached to the inductor segments 36, the housing 32, or any other suitable structure of the inductor box 24. The guides 43 are disposed along a length of the inductor box 24. In some embodiments, the guides 43 are evenly spaced along the length of the inductor box 24. Moreover, the guides 43 include a shaped end 45 to direct the gate 41 away from the inlet 44. For example, the shaped end 45 may include a ramped side, a rounded edge, a slope, a wedge, etc., such that when the gate 41 contacts the guides 43, the gate 41 is directed away from the inlet 44. The inductor box 24 also includes bypass channels 102 that direct the gate 41 toward the inlet 44. As such, the gate 41 is held between the guides 43 and the bypass channels 102. In some embodiments, another structure (e.g., guide) besides the bypass channels 102 may hold the gate 41 up.

The inductor box 24 includes a storage slot 46 through which the gate 41 may be inserted while not being used (e.g., while removed from being disposed between the inlet 44 and the cavity 40). As illustrated, the gate 41 includes an opening 47 that is configured to engage a storage tab 48. After inserting the gate 41 in the storage slot 46 and engaging the opening 47 with the storage tab 48, a pin may be inserted through the storage tab 48 to secure the gate 41 to the inductor box 24. Furthermore, the gate 41 includes a lip 49 that in some embodiments may abut the side 42 while the gate 41 is disposed between the inlet 44 and the cavity 40. For example, in certain embodiments, the lip 49 at least partially blocks insertion of the gate 41 into the slot of the inductor box 24. Moreover, in some embodiments, the lip 49 may act as a handle for inserting and/or removing the gate 41. In certain embodiments, an end of the gate 41 opposite the lip 49 contacts a wall opposite the side wall 42 to block further insertion of the gate 41.

By using the gate 41, agricultural product flow between the tank 22 and the inductor box 24 may be blocked. Furthermore, the guides 43 direct the gate 41 toward the cavity 40 so that the gate 41 does not lift upwardly toward the tank 22 and inadvertently enable the agricultural product to flow around the gate 41. Thus, by using the gate 41 in conjunction with the guides 43, the inductor box 24 may operate more efficiently, thereby decreasing costs associated with planting operations.

Figure 4:
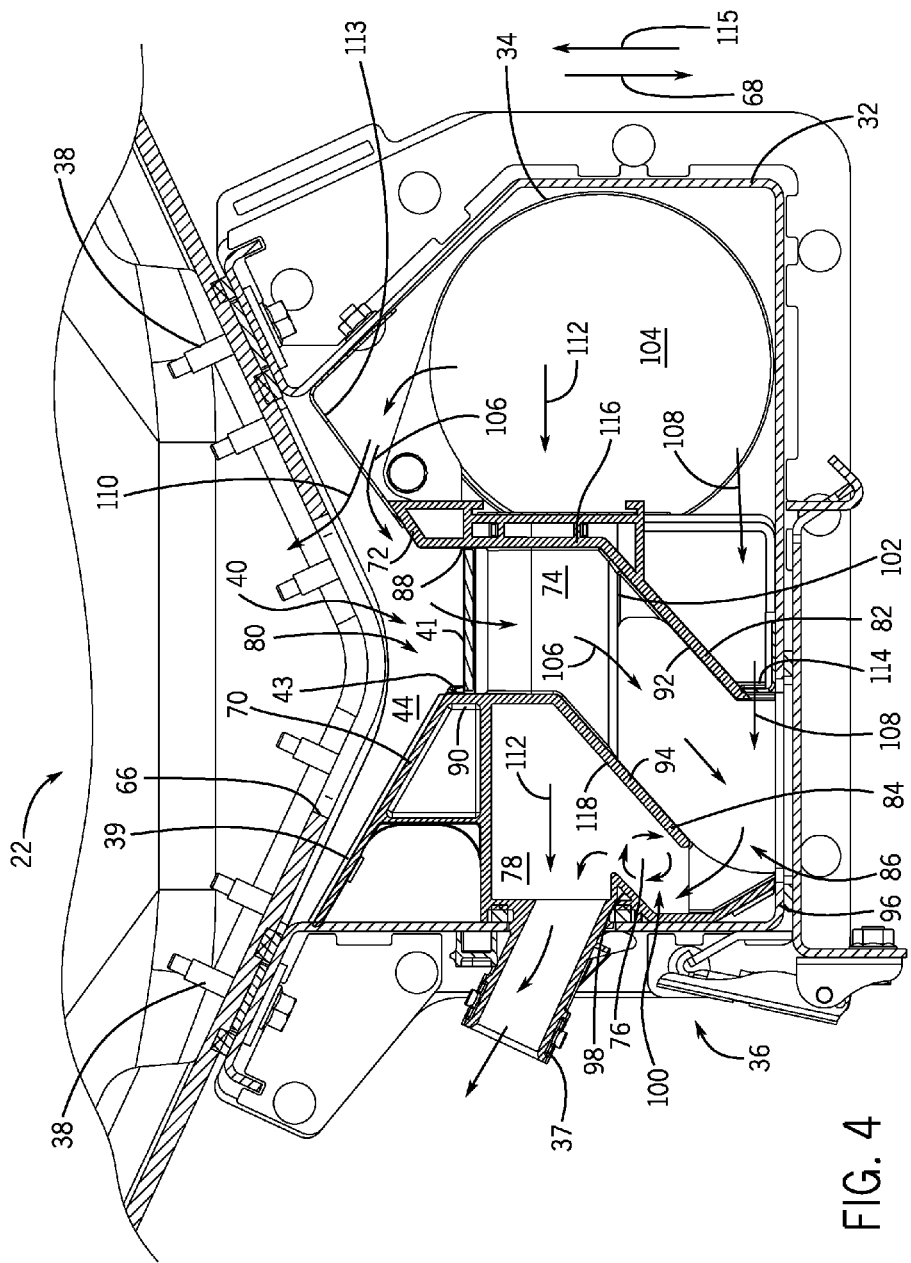
FIG. 4 is a cross-sectional side view of an embodiment of the inductor box of FIG. 2 including guides.

FIG. 4 is a cross-sectional side view of an embodiment of the inductor box 24 of FIG. 2 including guides 43. As illustrated, the inductor box 24 is coupled to the tank 22 with bolts 38. The inductor box 24 surrounds an agricultural product outlet(s) 66 of the tank 22, thereby enabling agricultural product to exit the tank 22 and enter the inlet 44 of the inductor box 24. More specifically, as the agricultural product exits the tank 22, in direction 68, the agricultural product enters the inductor segment(s) 36. Each inductor segment 36 is disposed within the cavity 40 of the housing 32. The top 39 of the inductor segment 36 includes two surfaces 70 and 72. The surfaces 70 and 72 are angled to direct the flow of the agricultural product into the inductor segment 36. As the agricultural product travels through the inductor segment 36, the agricultural product passes through a series of chambers before exiting through the agricultural product delivery port 37.

The chambers in the inductor segment 36 include an agricultural product supply chamber 74, a fluidization chamber 76, and an agricultural product delivery chamber 78. Each of the chambers of the inductor segment 36 may be referred to as a seed cavity. The angled surfaces 70 and 72 channel the agricultural product from the tank 22 into the agricultural product supply chamber 74 through an agricultural product supply chamber inlet 80. The agricultural product supply chamber 74 guides the agricultural product from the agricultural product supply chamber inlet 80 to an agricultural product supply chamber outlet 86 via a first wall 82 and a second wall 84. As illustrated, the walls 82 and 84 include respective vertical portions 88 and 90, as well as respective angled portions 92 and 94. As the agricultural product flows through the agricultural product supply chamber 74, the angled portions 92 and 94 of the walls 82 and 84 direct the agricultural product toward the agricultural product supply chamber outlet 86 at a base 96 of the inductor box 24.

Airflow from the air supply then conveys the agricultural product through the agricultural product supply chamber outlet 86 and into the fluidization chamber 76. The fluidization chamber 76 includes a first wall 98 and shares the second wall 84 of the agricultural product supply chamber 74. If the air flow through the fluidization chamber 76 is sufficient, the agricultural product will fluidize and a vortex flow is created due to the geometry of the fluidization chamber 76. The vortex 100 separates and mixes the agricultural product with the airflow before the agricultural product flows to the agricultural product delivery chamber 78. If the airflow through the fluidization chamber 76 is sufficient, the agricultural product is conveyed out of the fluidization chamber 76 and into the agricultural product delivery chamber 78. In the agricultural product delivery chamber 78, airflow from a bypass channel 102 conveys the agricultural product out of the agricultural product delivery chamber 78, through the agricultural product delivery port 37, and to the row units 20.

As explained above, the inductor box 24 includes the air supply port 34 for receiving airflow from an air supply that pressurizes the tank 22 and conveys agricultural product through the inductor segment 36. The airflow from the air supply passes through the air supply port 34 and enters an air supply chamber 104. The air supply chamber 104 extends through the inductor box 24 in a generally perpendicular direction to the flow path through the inductor segments 36, thereby supplying each inductor segment 36 with the airflow.

The air supply chamber 104 divides the airflow from the air supply into four airflow paths numbered 106, 108, 110, and 112. The first airflow path 106 passes through a first screen 113 and enters the agricultural product supply chamber 74. As illustrated, the first screen 113 enables airflow to exit the air supply chamber 104, while simultaneously blocking agricultural product from entering the air supply chamber 104, thus reducing maintenance costs and/or the duration of maintenance operations. As the airflow through the first airflow path 106 enters the agricultural product supply chamber 74, the airflow engages the agricultural product and urges the agricultural product in direction 68. For example, when using light agricultural product (e.g., seeds such as flax, canola, sesame, poppy, sunflower, sweet corn, etc.), the airflow through airflow path 106 may reduce blockage of the agricultural product supply chamber 74 by providing additional force (in addition to gravity) to move the agricultural product through the agricultural product supply chamber 74.

While the airflow through the first airflow path 106 facilitates urging the agricultural product in the direction 68 through the agricultural product supply chamber 74, the airflow through the second airflow path 108 conveys the agricultural product out of the agricultural product supply chamber 74 and into the fluidization chamber 76. The airflow through the second airflow path 108 flows through a second screen 114. The second screen 114 is coupled to the first wall 82 and the base 96 of the inductor box 24. The second screen 114, like the first screen 113, blocks the agricultural product from entering the air supply chamber 104. Thus, the first screen 113 and the second screen 114 reduce maintenance costs/duration by blocking agricultural product flow into the air supply chamber 104.

A third airflow path 110 flows through the first screen 113 and into the tank 22. The airflow in the third airflow path 110 pressurizes and expands the tank 22. However, in some embodiments, the lid 28 may not create a fluid tight seal with the tank 22. Accordingly, airflow in the third airflow path 110 may provide continuous airflow into the tank 22 to replace pressurized air lost through leaks in the lid 28. As a result, airflow from the first airflow path 106 is able to flow through the agricultural product supply chamber 74, and the airflow in the second airflow path 108 is able to convey the agricultural product into the fluidization chamber 76. In other words, the airflow in the third airflow path 110 pressurizes the tank 22, thus equalizing pressure within the system. As a result, backdrafts (i.e., airflow) from the second airflow path 108 into the tank 22 are substantially reduced or eliminated in direction 115. Moreover, the airflow through the third airflow path may reduce or eliminate backflowing airflow through the inductor segment 36 when the air supply shuts down.

As explained above, the airflow through the third airflow path 110 pressurizes and expands the tank 22. When the air supply shuts down the pressurized air from the tank 22 travels through the path of least resistance to escape the tank 22. In the present embodiment, a portion of the airflow venting from the tank 22 passes through the first screen 113 and into the air supply chamber 104. As a result, the possibility of pressurized air in the tank 22 backflowing through the air bypass channel 102 (and carrying agricultural product with it) is substantially reduced. Specifically, airflow through the first screen 113 may reduce or eliminate pressurized airflow (carrying agricultural product with it) from passing through the agricultural product supply chamber 74, through the fluidization chamber 76, through the agricultural product delivery chamber 78, through the air bypass channel 102, and into the air supply chamber 104. Accordingly, the first airflow path 106 enables pressurized air to escape the tank 22, thus substantially reducing or eliminating fluidized agricultural product from flowing through the air bypass channel 102.

The airflow in the fourth airflow path 112 flows from the air supply chamber 104 through the air bypass channel 102 and into the agricultural product delivery chamber 78. The air bypass channel 102 is disposed within the agricultural product supply chamber 74 and extends between the first agricultural product supply chamber wall 82 and the second agricultural product supply chamber wall 84. The walls 82 and 84 include respective apertures 116 and 118 that enable the airflow of the fourth airflow path 112 to pass through the air bypass channel 102. The air bypass channel 102 is oriented in a generally crosswise direction to the agricultural product supply chamber inlet 80 and in a generally parallel direction to the agricultural product supply chamber outlet 86. Moreover, the air bypass channel 102 is positioned above the fluidization chamber 76, thereby enabling the airflow from the fourth airflow path 112 to urge the agricultural product exiting the fluidization chamber 76 into the agricultural product delivery port 37 for delivery to the row units 20.

As illustrated, the inductor segment 36 includes the guide 43 disposed vertically over the gate 41. As discussed above, the guide 43 directs the gate 41 toward the cavity 40 so that the gate 41 does not lift upwardly toward the tank 22 and, thereby, inadvertently enable the agricultural product to flow around the gate 41. Thus, by using the gate 41 in conjunction with the guide 43, the inductor box 24 may operate more efficiently, thereby decreasing costs associated with planting operations. Furthermore, the bypass channel 102 directs the gate 41 toward the tank 22 and aids to hold the gate 41 between the guide 43 and the bypass channel 102.

Figure 5:
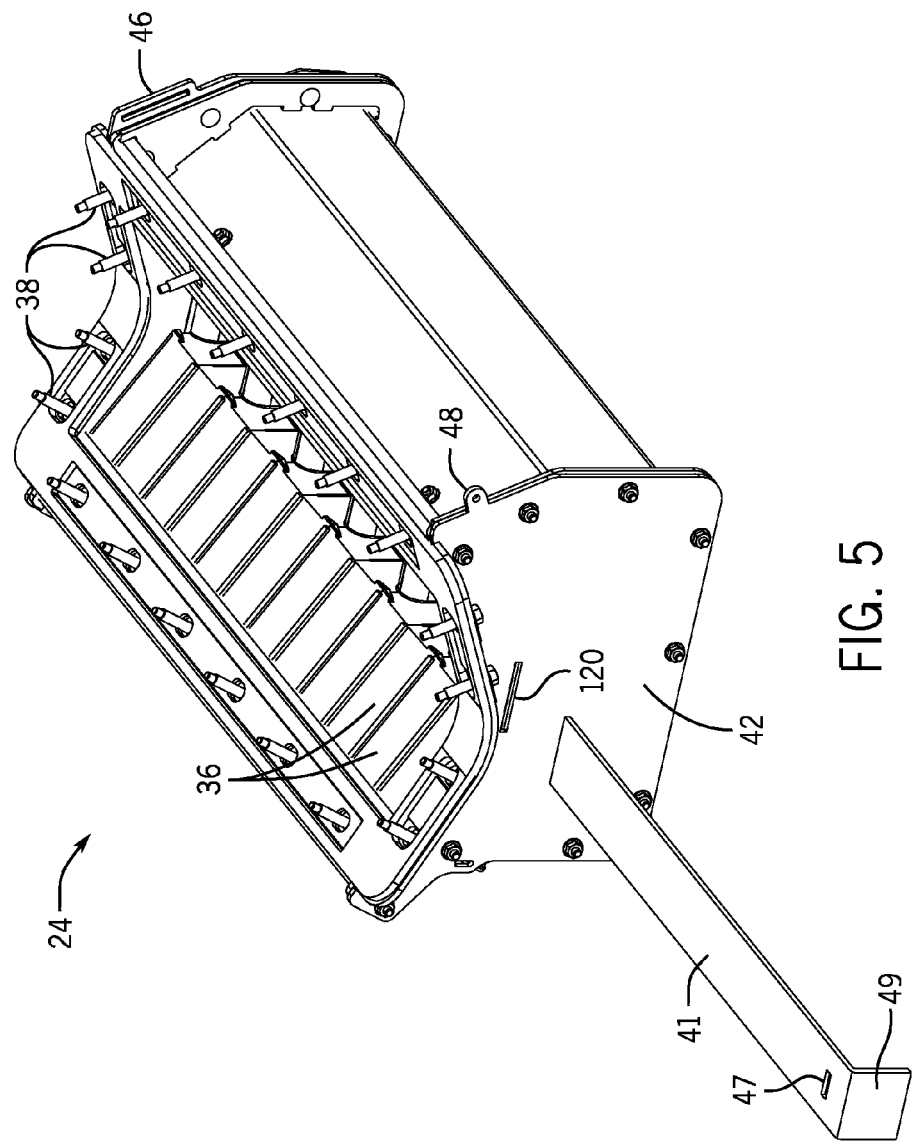
FIG. 5 is a perspective view of an embodiment of the inductor box of FIG. 2 including a slot for insertion of a gate.

FIG. 5 is a perspective view of the inductor box 24 of FIG. 2 that includes a slot 120 through which the gate 41 may be inserted into the inductor box 24. As illustrated, the slot 120 may be approximately the same width and height as the gate 41 to facilitate guiding the gate 41 into the inductor box 24. The slot 120 is formed in the side wall 42; however, depending on the design of the inductor box 24, the slot 120 may be disposed within any suitable external wall of the inductor box 24. In certain embodiments, the side wall 42 at least partially blocks insertion of the gate 41 into the slot 120 as the lip 49 of the gate 41 contacts the side wall 42. The lip 49 extends substantially perpendicular to the body of the gate 41 so that the lip 49 is not insertable into the slot 120. In some embodiments, an end of the gate 41 opposite the lip 49 contacts a wall opposite the side wall 42 to block further insertion of the gate 41. As the gate 41 is inserted into the slot 120, the guides 43 direct the gate 41 toward the cavity 40 and away from the inlet 44.

By using the gate 41, agricultural product flow between the tank 22 and the inductor box 24 may be blocked. Furthermore, the guides 43 direct the gate 41 toward the cavity 40 so that the gate 41 does not lift upwardly toward the tank 22 and inadvertently enable the agricultural product to flow around the gate 41. Thus, by using the gate 41 in conjunction with the guides 43, the inductor box 24 may operate more efficiently, thereby decreasing costs and the duration associated with planting operations.

FIG. 6 is a perspective view of an embodiment of a portion of the inductor box 24 of FIG. 3 including the guide 43, taken within line 6-6. As described above, the guide 43 includes the shaped end 45 to direct the gate 41 away from the inlet 44. In the illustrated embodiment, the shaped end 45 includes a first ramped side 140, and a second ramped side 142 is positioned on an opposite side of a contact point 144 from the first ramped side 140. The first ramped side 140 is configured to direct the gate 41 toward the contact point 144, and the contact point 144 is configured to direct the gate 41 away from the inlet 44.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An inductor box for an agricultural implement, comprising:
    an inlet configured to receive agricultural product from a tank;
    a housing having a cavity therein, wherein the cavity is configured to receive the agricultural product from the inlet;
    a gate configured to be removably inserted between the inlet and the cavity, to block the agricultural product from entering the cavity while disposed between the inlet and the cavity, and to enable the agricultural product to enter the cavity while removed from being disposed between the inlet and the cavity; and
    a first guide coupled to the housing and configured to direct the gate away from the inlet, wherein the first guide is disposed between the gate and the inlet while the gate is disposed between the inlet and the cavity, the first guide comprises a first ramped side on a leading edge and a second ramped side on a trailing edge, the first ramped side is configured to direct the gate toward a contact point, and the contact point is configured to block deflection of the gate toward the inlet.

2. The inductor box of claim 1, wherein the housing comprises a slot configured to receive the gate.

3. The inductor box of claim 2, wherein the gate comprises a lip to facilitate insertion of the gate into the slot.

4. The inductor box of claim 1, wherein the inductor box is fluidly coupled to the tank.

5. The inductor box of claim 1, wherein the gate is configured to be removably inserted between the first guide and a second guide of the inductor box.

6. The inductor box of claim 1, comprising a second guide coupled to the housing and configured to direct the gate away from the inlet, wherein the second guide is disposed between the gate and the inlet while the gate is disposed between the inlet and the cavity.

* * * * *